(12) United States Patent
Schiffbauer

(10) Patent No.: US 6,810,353 B2
(45) Date of Patent: Oct. 26, 2004

(54) NON-DIRECTIONAL MAGNET FIELD BASED PROXIMITY RECEIVER WITH MULTIPLE WARNING AND MACHINE SHUTDOWN CAPABILITY

(75) Inventor: William H. Schiffbauer, Pittsburgh, PA (US)

(73) Assignee: The United States of America as represented by the Secretary of the Department of Health and Human Services, Centers for Disease Control, Washington, DC (US)

(*) Notice: Subject to any disclaimer, the term of this patent is extended or adjusted under 35 U.S.C. 154(b) by 0 days.

(21) Appl. No.: 10/045,741

(22) Filed: Oct. 26, 2001

(65) Prior Publication Data

US 2002/0082803 A1 Jun. 27, 2002

Related U.S. Application Data

(60) Provisional application No. 60/243,641, filed on Oct. 26, 2000.

(51) Int. Cl.[7] .............................. G08B 23/00; G01B 5/02
(52) U.S. Cl. ............... 702/159; 340/539.11; 340/573.1; 340/870.01; 342/458
(58) Field of Search .................................. 702/158, 159; 342/118, 434, 427, 458; 340/539.11, 691.3, 573.1, 870.01, 941, 539

(56) References Cited

U.S. PATENT DOCUMENTS

| | | | | |
|---|---|---|---|---|
| 3,708,671 A | * | 1/1973 | Story | 340/870.01 |
| 4,263,597 A | * | 4/1981 | Bentley et al. | 342/434 |
| 4,518,009 A | * | 5/1985 | Schiemann | 137/571 |
| 4,849,735 A | * | 7/1989 | Kirtley et al. | 340/539 |
| 4,906,972 A | * | 3/1990 | Spencer | 340/539 |
| 5,170,172 A | * | 12/1992 | Weinstein | 342/458 |
| 5,939,986 A | | 8/1999 | Schiffbauer et al. | 340/573.1 |
| 6,208,260 B1 | * | 3/2001 | West et al. | 340/691.3 |

OTHER PUBLICATIONS

Sivakumar, Pub. No.: US 2002/0049056 A1, Pub. Date: Apr. 25, 2002, "Local information provision".*
Schiffbauer, "A Workplace Safety Device for Operators of Remote Controlled Continuous Mining Machines", *American Journal of Industrial Medicine*, 00:1–3 (1999).

* cited by examiner

Primary Examiner—John Barlow
Assistant Examiner—John Le
(74) Attorney, Agent, or Firm—Klarquist Sparkman, LLP

(57) ABSTRACT

A hazardous area warning system with a non-directional magnetic field based proximity receiver for warning personnel of an attendant hazard. The receiver includes a x-axis receiver with an antenna directed in a x direction, a y-axis receiver with an antenna directed in a y direction and a z-axis receiver with an antenna directed in a z direction. The antennas may be a wire loop wrapped around a ferrite core. The output from each of the three receivers are combined in an adder. The combined result from the adder is representative of the distance between the receiver and a warning transmitter antenna. A comparator determines whether the received signal indicates an attendant hazard, i.e., the receiver is too close to the warning transmitter. The receiver wearer is warned of the attendant hazard, visually and/or tactilly, e.g., with warning lights and/or vibrations. An encoder encodes the signal indication and a transmitter transmits the encoded signal. A data link receiver (located, for example, at a potentially hazardous machine) receives the encoded signal from the proximity receiver. The data link receiver decodes the encoded signal and activates a safety indicator light in response to the decoded information, a green light indicating normal operation, a yellow light indicating a caution or potentially hazardous condition, and a red light indicating danger. The data link receiver may shutdown and/or disable the machinery in a caution or dangerous condition.

26 Claims, 3 Drawing Sheets

NON-DIRECTIONAL MAGNET FIELD BASED PROXIMITY RECEIVER WITH MULTIPLE WARNING AND MACHINE SHUTDOWN CAPABILITY

RELATED APPLICATION INFORMATION

This patent application claims the benefit of provisional U.S. Patent Application No. 60/243,641, filed Oct. 26, 2000, which is hereby incorporated herein by reference.

BACKGROUND OF THE INVENTION

1. Field of the Invention

The present invention relates generally to a system for protecting individuals engaged in activity around operating machinery and, more particularly, to a personnel warning and machinery disabling system for alerting and protecting individuals straying into a hazardous zone in a mine and/or straying too close to operating machinery.

2. Background Description

Personnel unknowingly entering into areas in close proximity to operating machinery may place themselves in danger and be injured or killed. Consequently, ways of preventing such injuries are constantly being investigated. In coal mining, a well known major safety concern is that of personnel becoming permanently disabled or killed by machinery or by powered haulage. Between 1992 and 1997, 24 fatalities were associated with continuous mining machines. At least some of these accidents occurred because mining machine operators and their assistants become preoccupied with operating the coal mining equipment and unwittingly place themselves in potentially hazardous locations, i.e., within the danger zone of the operating machinery.

In addition, the operator must perform a variety of tasks with the machine, each of which may raise a potential hazard or increase visual requirements such that the operator does not always have a good visual sense of the machine's location or whether someone is within the zone of danger. It has been found that a large portion of the time, operators still place themselves unknowingly within the hazard zone, even while the machinery is operating.

One way that mine safety has been improved is by using radio remote-control to place operators away from the hazards of operating machinery. These remote-controlled machines allow the operators greater mobility so that the operator can see potentially critical worksite areas that would otherwise not be visible to an onboard machine operator. However, the remote operators are still vulnerable, and not always aware of their position. So, they may still occasionally stray into the hazard zone near an operating machine.

Furthermore, after turning off equipment or machinery with the remote control, e.g., to service the machine, the operator may intentionally enter the danger zone. As long as the machine is disabled, the operator is safe. When the operator is servicing the machine, however, someone else, unaware of the operator's location, might use the remote control to reactivate the machine, thus placing the servicing operator in danger.

So, especially in the close quarters of a mine entry, it is important to know, as precisely as possible, when the operator or other personnel are within a safe distance of operating machinery or when they have entered the danger zone. To that end, U.S. Pat. No. 5,939,986 entitled "Mobile Machine Hazardous Working Zone Warning System" to Schiffbauer et al., issued Aug. 17, 1999, teaches a warning system for mobile working machinery that includes loop antennas that are distributed about mining machinery to define a warning zone. The direction of the radiation from each loop is perpendicular to that loop. The shape of the zone is determined by the shape of each loop antenna field decreases with one over the cube of the distance from the loop. A personnel warning device and receiver is worn by a protected individual and includes a single ferrite loop antenna that receives the signal as a person enters the field.

While the system taught in Schiffbauer et al. provides some warning to the wearer, it does not provide positional accuracy because both the loop radiation and the receiver antenna are directional. At any distance from the loop, signal strength is maximum when the receiver antenna is parallel to the loop and is minimum when the receiver antenna is perpendicular to the loop. So, signal strength varies depending upon the direction of the single receiver antenna to the loop antenna, at any given distance from the loop. Thus, it is difficult to determine whether the signal strength is due to antenna alignment or distance from the loop.

Accordingly, there is a need for a safety system to make a machine operator aware of the danger zone, to warn the operator, and selectively disable the machine when the operator is in the zone of danger or when others enter the zone of danger. More particularly, a safety system is needed that provides better precision in terms of when an operator is in a danger zone, substantially irrespective of the relative orientation between the transmitter and receiver antennas.

SUMMARY OF THE INVENTION

It is therefore a purpose of the invention to reduce the hazard to operators of machinery.

It is another purpose of the invention to warn machine operators when they or other personnel enter the danger zone of operating machinery.

It is yet another purpose of the invention to stop operating machinery when the operator and/or others unintentionally enter the danger zone.

It is yet another purpose of the invention to disable operating machinery when persons enter the danger zone of the operating machinery.

It is yet another purpose of the invention to improve the sensitivity and/or accuracy of personnel safety equipment around hazardous machinery.

The present invention is a hazardous area warning system with a non-directional magnetic field based proximity receiver for warning personnel of an attendant hazard. The receiver which is worn by an operator (or other personnel) and provides feedback (e.g., warning lights, sound, and/or vibrations) to the wearer as to proximity to a danger zone defined by a magnetic field generated by a transmitter thereto. The receiver minimizes the directional effects inherent in the relative orientation between antennas of the receiver and transmitter of prior systems, providing a more accurate feedback to the operator in hazardous condition areas. In a preferred form, the receiver includes a x-axis receiver with an antenna directed in a x direction, a y-axis receiver with an antenna directed in a y direction and a z-axis receiver with an antenna directed in a z direction. The antennas may be a wire loop wrapped around a ferrite core. The output from each of the three receivers are combined in an adder. The combined result from the adder is representative of the distance between the receiver and a warning transmitter antenna. A comparator determines whether the received signal indicates an attendant hazard, i.e., the receiver is too close to the warning transmitter. Warning devices, such as, for example, visual, audio, and/or vibrational device may be incorporated into the receiver to alert the wearer of the receiver that he/she has entered a hazardous area as indicated by activation level of the received signal. An encoder encodes the signal indication and a transmitter transmits the encoded signal. A data link receiver located, for example at a potentially hazardous machine, receives the encoded signal from the proximity receiver. The data link receiver decodes the encoded signal and activates a safety indicator light or other warning device, preferably mounted on or near the operating machine, in response to the decoded information. Preferably, a green light indicates normal operation, a yellow light indicates a caution or potentially hazardous condition, and a red light indicates danger. The data link receiver may shutdown and/or disable the machinery in a caution or dangerous condition. Advantageously, the receiver of the system of the present invention is omni-directional and provides much better positional accuracy for warning personnel when entering potentially hazardous areas. Further, the system of the present invention can shut down and disable dangerous equipment when personnel are in the machinery's danger zone.

DETAILED DESCRIPTION OF THE PREFERRED EMBODIMENTS

Figure 1A:
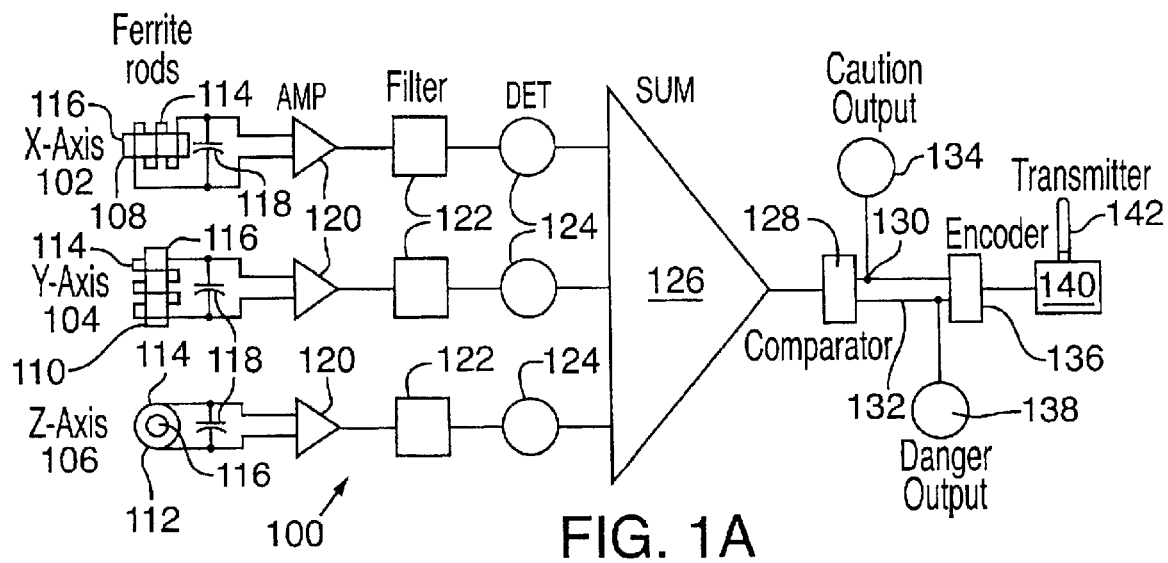
FIG. 1A is a block diagram showing the preferred embodiment omnidirectional magnetic field based proximity receiver according to the preferred embodiment of the present invention.

Referring now to the drawings and, more particularly, FIG. 1A is a block diagram showing the preferred embodiment omnidirectional magnetic field based proximity receiver 100 according to a preferred embodiment of the present invention. The preferred embodiment receiver has circuitry including three (3) directional, axis receiver channels 102, 104 and 106. Each axis receiver channel 102, 104, 106 includes a directional antenna 108, 110, 112, directed along one axis and each antenna 108, 110, 112 is mounted perpendicular to the plane of the other two axis antennas 110, 112, 108.

The axis antennas 108, 110, 112 are each a loop of wire 114 wrapped around a ferrite rod 116. A capacitor 118 is connected in parallel with the wire loop 114. On each axis 102, 104, 106 the loop 114 and capacitor 118 are connected to an amplifier 120. The output of the amplifier 120 is filtered in filter 122, which is preferably a bandpass filter. The output of filter 122 is connected to the input of detector 124 which detects a signal above a preselected value. Detector 124 provides an input to a 3-way adder 126. The output of the 3-way adder 126 is passed to comparator 128. Comparator 128 has two outputs 130, 132. Output 130 is provided to a caution warning indicator 134 and to encoder 136. Output 132 is provided to danger indicator 138 and encoder 136. The output of encoder 136 is then passed to transmitter 140. Transmitter 140 is connected to an antenna 142.

Capacitor 118 in combination with the antenna provides a tank circuit, tuned to the resonant frequency of the transmitter, preferably 60 kHz. The signal received by any antenna 108, 110, 112 is passed to an amplifier 120 which amplifies the signal and passes the amplified signal to the filter 122. The filter 122 filters out any noise, passing only amplified 60 kHz signal to a detector 124. The detectors 124 pass any signal received at their particular axis to the 3-way adder 126. Preferably, 3-way adder 126 provides a vector sum of the directional signals from each of the three axis, 102, 104 and 106. However, for simplicity, a simple sum of the signals from detectors 124 still in each receiver channel 102, 104, 106 provides a suitable indication of signal strength. The sum from the 3-way adder is passed to the comparator.

The three dimensional arrangement of directional antennas 108, 110, 112 insures that even when one of the antenna 108, 110, 112 is aligned perpendicularly with the loop (i.e., its minimum signal alignment), the other two antennas are at, or near to, 90 degree angles to the loop, receiving the maximum signal. Since the sum of the three signals is dependent on the strength of the individual signals, the sum at the output of 3-way adder 126 is relative to the nearness of the proximity receiver 100 wearer to the source of the signal being received. Thus, the output of 3-way adder 126 is a first order indication of the potential danger to the wearer.

When the signal is below a pre-selected level, indicating that the wearer is not in a danger zone, nothing passes from the comparator 128 on either output, 130, 132. When the signal rises above that pre-selected level, indicating that the wearer is close to the danger zone, a signal is passed on output 130 to caution indicator 134 and encoder 136. If the signal rises further and exceeds a second selected level, indicating that the wearer is in danger, the comparator 128 passes the second output 132 to danger indicator 138 and encoder 136. As noted hereinabove, danger indicator 138 may be or may include a vibrating motor; alternatively, danger indicator 138 may also incorporate visual or audio warning devices. The encoder 136 encodes the signal on either comparator output 130, 132 and passes the encoded signal to transmitter 140. Transmitter 140 transmits a coded indication of one of the three states, normal, caution or danger on antenna 142.

Figure 1B:
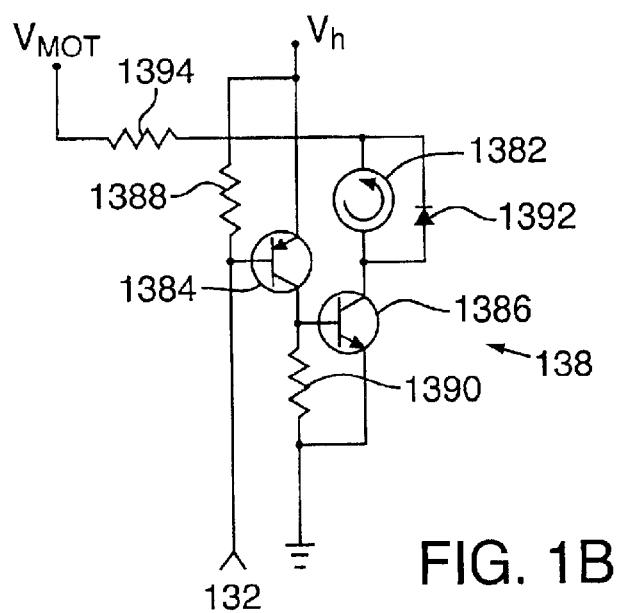
FIG. 1B is a schematic diagram of an optional embodiment danger indicator.

In an optional embodiment, danger indicator 138 provides a tactile indication of an attendant hazard as can be seen in the example of FIG. 1B, wherein danger indicator 138 includes a vibrating motor 1382. A danger indication signal, comparator output 132 is connected to the base of pnp transistor 1384. The emitter of transistor 1384 is connected to the circuit supply voltage ($V_h$) and the collector of transistor 1384 is connected to the base of npn transistor 1386. The source of transistor 1386 is connected to ground and the collector of transistor 1386 is connected to one side of vibrating motor 1382. Base bias resistor 1388 is connected, base to source, to transistor 1384 and base bias resistor 1390 is connected, base to source, to transistor 1386. Overshoot protection diode 1392 is connected in parallel with vibrating motor 1382. Current limiting resistor 1394 is connected between motor supply voltage ($V_{Mot}$) and the vibrating motor 1382 and, correspondingly, the cathode of diode 1392.

Thus, in this optional embodiment, when the danger indication signal 132 is asserted, it is pulled low to turn on transistor 1384. When transistor 1384 turns on, it pulls the base of transistor 1386 high, turning on transistor 1386. Transistor 1386 turning on provides ground to vibrating motor 1382, turning on vibrating motor 1382. When the danger indication signal 132 returns high, transistor 1384 turns off, turning off transistor 1386, which in turn turns off vibrating motor 1382. Diode 1392 is included for overshoot protection, to limit the overshoot that normally occurs across the inductive windings of a motor when current flow is interrupted. So, when the vibrating motor 1382 is turned off, diode 1392 limits the overshoot voltage at the collector of transistor 1386, protecting transistor 1386 and providing a current path to $V_{Mot}$ through resistor 1394.

Figure 2:
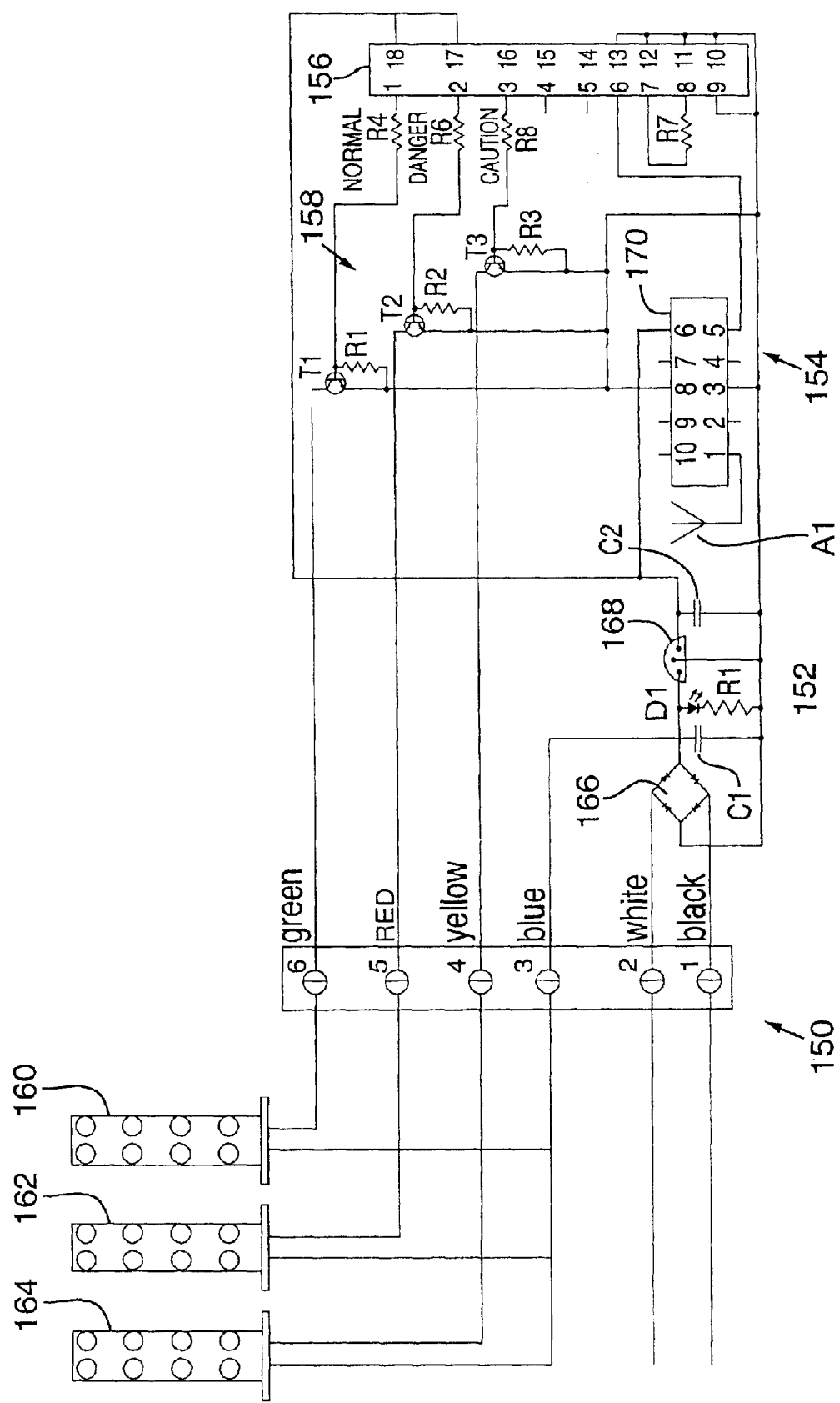
FIG. 2 is a schematic diagram of a preferred embodiment data link receiver for receiving a personnel warning signal from the proximity receiver of FIG. 1A.

FIG. 2 is a first preferred embodiment data link receiver 150 for receiving a personnel warning signal from the proximity receiver 100 of FIG. 1A. This preferred embodiment includes a power section 152, a receiver 154, a decoder 156, a driver section 158, and indicator lights 160, 162, 164. The power section 152 includes a bridge rectifier 166, a simple AC filter, capacitor C1. The bridge rectifier 166 and filter capacitor C1 are connected to integrated circuit voltage regulator 168 and across series connected power-indicator light emitting diode (LED) D1 and resistor R1. The supply output of voltage regulator 168 is connected to supply filter capacitor C2. It is understood that this power source can be replaced with any suitable power source that will provide sufficient voltage to run the preferred embodiment circuit. The receiver 154 includes an antenna A1 connected to a receiver chip 170. The output of receiver chip 170 is connected to the input of decoder 156. The outputs of decoder 156 are the inputs to driver section 158. Driver section 158 is three resistor biased NPN transistors that are each connected at their respective collectors to a side of one indicator light 160, 162, 164, which are connected at the other side to the supply voltage. Preferably, indicator light 160 is green, 162 is red, and 164 is yellow.

A signal from a proximity receiver 100 at antenna A1 is amplified and filtered by receiver module 154. Preferably, receiver module 154 is an RXM 418 LC Linx Technologies receiver module, although any suitable receiver module may be substituted. The output of receiver module 154 is passed to decoder module 156. Decoder module 156 decodes the output signal from the receiver chip 170, interpreting the output as indicating a normal condition, a caution condition or a danger condition. Preferably, decoder module 156 is a HT-694 Holtek decoder. Based on the decoded signal, a single output line is driven high, either the normal line, caution line, or danger line to the driver section 158. Depending on which line is high, a corresponding transistor in the driver section 158 is turned on. When a transistor turns on, it provides ground to the connected side of the corresponding indicator light 160, 162 or 164, turning on the indicator light to visibly indicate machine safety conditions. Preferably, this data link receiver 150 is mounted on a machine and the indicator lights 160, 162, 164 are visible so that anyone within the line of sight of the lights can see machine safety status, i.e., if someone is within the caution zone or danger zone for that particular machine.

Figure 3:
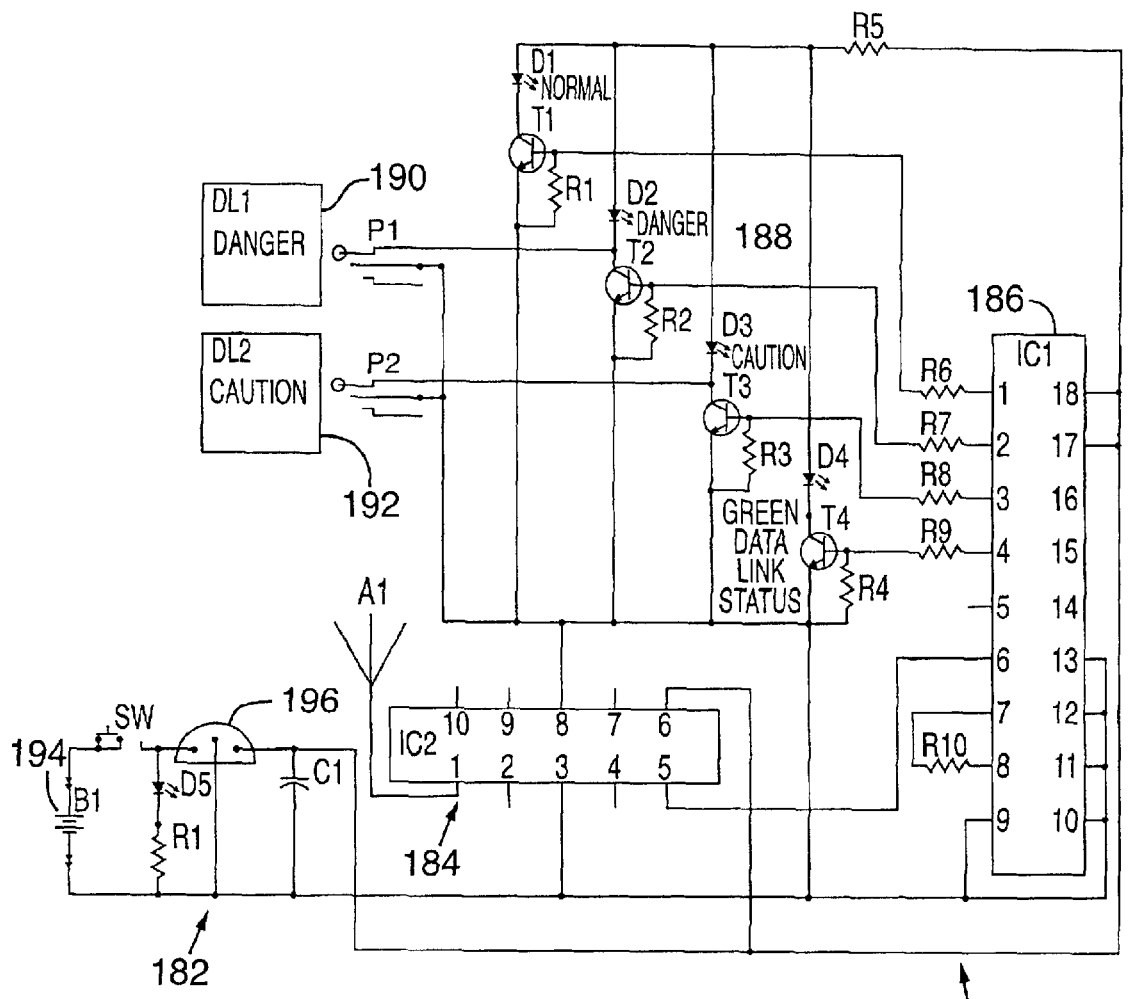
FIG. 3 is a schematic diagram of a second preferred embodiment data link receiver.

FIG. 3 is a second preferred embodiment data link receiver 180 that is intended to provide a localized indication of operating conditions and for logging occurrences of hazardous situations. The second preferred embodiment includes a power section 182, a receiver section 184, a decoder section 186, a driver section 188 and, in addition, a data logger section including two data loggers 190, 192. In this embodiment, indicator lights 160, 162 and 164 are replaced by LEDs D1, D2, and D3, respectively. In addition, a green status LED D4 is included, providing an indication of when a signal is being received by the receiving section. The power section 182 of this embodiment is similar to the first embodiment 152, however, instead of AC power, this embodiment includes a battery power source 194 switched by switch SW1. Series connected resistor R1 and LED D5 indicate when power is supplied (i.e., switch SW1 is closed) to the voltage regulator 196 of the second preferred embodiment 180. It is understood that the power source of the first embodiment or, any suitable power source may be substituted to provide a five-volt supply in this embodiment.

The antenna A1 and receiver module 184 of this embodiment are essentially the same as antenna A1 and receiver module 154 of the first preferred embodiment. Further, the decoder module of the decoder section 186 is identical or similar to the decoder module 156 of the first preferred embodiment. Accordingly, these like circuits have like operation and so, reference is made to the corresponding description of their function and operation in the first preferred embodiment.

In this embodiment there are four separate output signals provided from the decoder 186 and a visible indicator of status is provided by the four LEDs, D1, D2, D3, D4. D1 indicates a normal operation, D2 indicates danger and D3 indicates caution corresponding to lights 160, 162, 164 of the first preferred embodiment as noted above. In addition, a green data link status LED D4 indicates when a signal is being received from the receiver at antenna A1. Data loggers 190, 192 log and indicate instances of occurrences of caution or danger conditions in the system. Also included are a pair of optional plugs, P1, P2, for recording and monitoring the equipment and, optionally, for connection to remote monitoring equipment. It should be noted that to provide a shutdown and disable function for this embodiment, the caution data logger module 192 may be replaced with an appropriate shutdown circuit, such as a relay, and danger data logger 190 may be replaced with another relay or a latch and a relay to disable the system from starting while it is in a danger condition, e.g., until the latch is reset.

Figure 4:
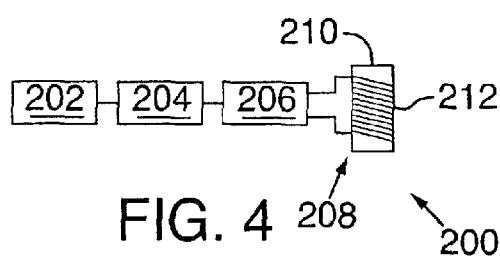
FIG. 4 is a block diagram of a stationary hazardous zone transmitter.

The preferred embodiments described hereinabove are described for use with a loop transmitter such as taught in U.S. Pat. No. 5,939,986 entitled "Mobile Machine Hazardous Working Zone Warning System" to Schiffbauer et al. issued Aug. 17, 1999 and incorporated herein by reference. FIG. 4 shows a stationary hazardous zone transmitter 200 for providing a warning in an open area, such as in an unsupported roof area where no equipment is located. This preferred hazardous zone transmitter 200 includes an oscillator 202, tuned to the transmission frequency, preferably 60 kHz. The output of the oscillator 202 is an input to a buffer amplifier 204. The output of buffer amplifier 204 is an input to antenna driver 206 and the output of antenna driver 206 drives antenna 208. In this embodiment, antenna 208 is similar to axis receiver antennas 102, 104 and 106. In particular, antenna 208 is ferrite core 210 with a loop of wire 212 wrapped around it. Preferably the ferrite rod is a one-inch (2.5 cm) diameter rod that is 12 inches (30 cm) long.

This stationary transmitter 200 may be located in a hazardous area such as an unsupported roof location and provides a large magnetic envelope radiating in all directions around the rod. The distance from the source may be determined with a higher degree of precision when used with the receiver of FIG. 1A. Operation of the transmitter 200 of FIG. 4 is relatively simple. Oscillator 202 provides the desired transmission frequency, preferably 60 kHz.

Buffer amplifier 204 amplifies the frequency output from the oscillator 202. Antenna driver 206 amplifies the frequency from buffer amplifier 204 and antenna 208 radiates the signal into the space immediately adjacent to the antenna 208.

Thus, the system of the present invention is omni-directional and provides much better positional accuracy for warning personnel when entering potentially hazardous areas. Further, the system of the present invention can shut down and disable dangerous equipment when personnel are in the machinery's danger zone.

While the invention has been described in terms of preferred embodiment, those skilled in the art will recognize that the invention can be practiced with modification within the spirit and scope of the appended claims.

I claim:

1. A hazardous area warning system for warning personnel of an attendant hazard when they may enter into hazardous areas, said system comprising:
    a receiver for receiving a directional signal indicating proximity of a hazard, and including circuitry that indicates a level of the received directional signal in a plurality of different directions;
    means for determining based on the indicated levels of the received directional signal in the plurality of different directions whether a received signal indicates proximity to an attendant hazard; and
    means for transmitting in response to a determination that the received signal indicates proximity to an attendant hazard an indication signal indicating that a person wearing said receiver is in a hazardous area.

2. A system as in claim 1, wherein said receiver comprises:
    x-axis receiving means directed along a x-axis and receiving a signal from a hazard zone transmitter;
    y-axis receiving means directed along a y-axis and receiving a signal from said hazardous zone transmitter;
    z-axis receiving means directed along a z-axis and receiving a signal from said hazardous zone transmitter, the x-, y-, and z-axes generally being mutually perpendicular to each other; and
    means for combining received signals from said x-axis receiving means, said y-axis receiving means and z-axis receiving means.

3. A system as in claim 2, wherein each of said x-axis receiving means, said y-axis receiving means, and said z-axis receiving means comprises:
    an antenna directed along a respective axis;
    an amplifier receiving signal from said antenna;
    a filter filtering an output from said amplifier; and
    a detector detecting the output of said filter to determine whether a signal is present in said output.

4. A system as in claim 3, wherein said antenna is a ferrite rod wrapped in wire.

5. A system as in claim 3, wherein said determining means comprises a comparator, said comparator determining whether an output of said combining means indicates that said directional receiving means is closer than a first distance to said transmitter.

6. A system as in claim 5, wherein said comparator further determines whether said receiver is closer than a second distance to said transmitter.

7. A system as in claim 6, wherein said determining means further includes a caution output linked to a first output of a decoder, a danger output connected to a second output of said decoder and an encoder connected to said first output and said second output.

8. A system as in claim 7, wherein when said comparator determines said receiver is within said first distance, said comparator places an output signal on said caution output; and when said comparator determines said receiver is within said second distance, said comparator places an output signal on said danger output.

9. A system as in claim 8, wherein said encoder encodes any outputs placed on said caution output and said danger output.

10. A system as in claim 7, wherein said danger output comprises vibrating means for providing personnel with a tactile indication of danger.

11. A system as in claim 1, further comprising a data link receiver, said data link receiver comprising data receiver means receiving a signal from said transmitting means; decoder means decoding said received signal; driver means driving a plurality of outputs responsive to said decoder means; and indicator means indicating a safety state responsive to said driver means.

12. A system as in claim 11, wherein said indicator means includes a yellow light, a red light and a green light.

13. A system as in claim 12, wherein said yellow light, red light and green light are LEDs and, said indicator means further includes a green status link LED.

14. A system as in claim 13, further comprising means for disabling a system being monitored.

15. A system as in claim 13, further comprising a first data logger logging danger situation occurrences; and a second data logger logging caution condition occurrences.

16. A system as in claim 1, further comprising a warning transmitter, said warning transmitter including an antenna, said antenna being a ferrite rod wrapped in a loop of wire.

17. A system as in claim 16, wherein said warning transmitter further comprises an oscillator driving a resonant frequency; a buffer amplifier buffering said resonant frequency from said oscillator; and an antenna driver driving said resonant frequency onto said antenna.

18. A system as in claim 1 further comprising a data link receiver receiving the indication of whether a person wearing said directional receiving means is in a hazardous area as an encoded signal indicating a safety condition; a decoder decoding said received encoded signal; and a plurality of indicators indicating said safety condition.

19. A data link receiver as in claim 18, wherein said plurality of indicators include a danger zone indicator, a caution indicator and a normal indicator.

20. A data link receiver as in claim 19, wherein said plurality of indicators are a red light, yellow light and green light.

21. A data link receiver as in claim 20, wherein said red light, green light and yellow light are LEDs.

22. A non-directional proximity receiver comprising:
    a x-axis receiver having an antenna directed in a first direction;
    a y-axis receiver having an antenna directed in a second direction, said second direction being perpendicular to said first direction;
    a z-axis receiver having an antenna directed in a third direction, said third direction being perpendicular to the plane of said first direction and said second direction;
    an adder combining signals from said x-axis receiver, said y-axis receiver and said z-axis receiver;
    a comparator determining whether a received signal indicates an attendant hazard;
    an encoder encoding said indication of an attendant hazard in response to a determination that the received signal indicates an attendant hazard; and a transmitter transmitting said encoded indication.

23. A proximity receiver as in claim 22, wherein each of said x-axis receiver, said y-axis receiver and said z-axis receiver further comprises an amplifier receiving a signal from said antenna; a filter filtering output from said amplifier; and a detector detecting a signal in said filtered output, an output of said detector being an input to said adder.

24. A proximity receiver as in claim 23, wherein each of said x-axis antenna, said y-axis antenna and said z-axis antenna is a wire wrapped around a ferrite rod.

25. A proximity receiver as in claim 24, further comprising a caution indicator connected to a first output of said comparator; and a danger indicator connected to a second output of said comparator.

26. A proximity receiver as in claim 25, wherein said danger indicator is a motor, vibrations from said motor providing an indication of danger.

* * * * *